United States Patent
Hirose

(10) Patent No.: US 8,415,825 B2
(45) Date of Patent: Apr. 9, 2013

(54) POWER CONVERSION DEVICE, METHOD OF CONTROLLING POWER CONVERSION DEVICE, AND VEHICLE WITH THE SAME MOUNTED THEREON

(75) Inventor: Satoshi Hirose, Miyoshi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/266,694

(22) PCT Filed: May 15, 2009

(86) PCT No.: PCT/JP2009/059033
§ 371 (c)(1),
(2), (4) Date: Oct. 27, 2011

(87) PCT Pub. No.: WO2010/131353
PCT Pub. Date: Nov. 18, 2010

(65) Prior Publication Data
US 2012/0039100 A1 Feb. 16, 2012

(51) Int. Cl.
*B60L 1/00* (2006.01)
(52) U.S. Cl. ............ 307/9.1; 307/10.1; 363/50; 180/271
(58) Field of Classification Search .................... 307/9.1, 307/10.1; 180/271; 363/50
See application file for complete search history.

(56) References Cited

U.S. PATENT DOCUMENTS 8,247,920 B2 * 8/2012 Hirasawa .................. 307/9.1
2005/0128671 A1 * 6/2005 Miyamoto .................. 361/118

FOREIGN PATENT DOCUMENTS

| JP | 9-201065 A | 7/1997 |
| JP | 2003-348856 A | 12/2003 |
| JP | 2004-201439 A | 7/2004 |
| JP | 2004-236371 A | 8/2004 |
| JP | 2005-198406 A | 7/2005 |
| JP | 2006-141158 A | 6/2006 |
| JP | 2008-061300 A | 3/2008 |
| WO | WO 2008/132949 A1 * | 11/2008 |

* cited by examiner

*Primary Examiner* — Jared Fureman
*Assistant Examiner* — Alfonso Perez Borroto
(74) *Attorney, Agent, or Firm* — Sughrue Mion, PLLC

(57) ABSTRACT

In a power conversion device of a vehicle, when a collision of a vehicle is detected, the voltage of a gate signal that drive a semiconductor switching element included in the power conversion device is decreased, and residual charge stored in a smoothing capacitor is discharged. Such a configuration increases switching loss when the semiconductor switching element is turned on or off during discharge of the residual charge in the power conversion device, so that discharge of the residual charge can be accomplished in a shorter time.

7 Claims, 9 Drawing Sheets

POWER CONVERSION DEVICE, METHOD OF CONTROLLING POWER CONVERSION DEVICE, AND VEHICLE WITH THE SAME MOUNTED THEREON

CROSS REFERENCE TO RELATED APPLICATION

This application is a National Stage of International Application No. PCT/2009/059033 filed May 15, 2009, the contents of all of which are incorporated herein by reference in their entirety.

TECHNICAL FIELD

The present invention relates to a power conversion device, a method of controlling the power conversion device, and a vehicle with the same mounted thereon, and more particularly relates to discharge control of residual charge in a capacitor included in a power conversion device in the event of a collision of a vehicle.

BACKGROUND ART

Recently, electric powered vehicles with a power storage device (e.g., a secondary battery or a capacitor) mounted thereon and running through use of driving force generated from electric power stored in the power storage device are receiving attention as environmentally friendly vehicles. Such electric powered vehicles include, for example, electric vehicles, hybrid vehicles, fuel cell vehicles, and the like.

Such electric powered vehicles may include a motor generator for generating driving force for running upon receiving electric power from the power storage device at the time of starting or acceleration, and generating power by regenerative braking at the time of braking to store electric energy in the power storage device. In order to control the motor generator in accordance with the state of running as described above, a power conversion device such as a converter or an inverter is mounted on an electric powered vehicle.

Such a power conversion device includes a large-capacity smoothing capacitor in order to stabilize supplied DC power. During operation of the power conversion device, charge in accordance with an applied voltage is stored in the smoothing capacitor.

As to the charge stored in the smoothing capacitor, it is necessary to discharge residual charge in the smoothing capacitor rapidly, in such a case where a collision of a vehicle has occurred.

Japanese Patent Laying-Open No. 2004-201439 (PTL 1) discloses a technique for controlling a converter to perform a boosting operation and a step-down operation alternately when supply of DC power is stopped in a voltage conversion system including smoothing capacitors provided at the input side and the output side of the converter capable of the boosting operation and the step-down operation, thereby consuming residual charge stored in the smoothing capacitors.

CITATION LIST

Patent Literature

PTL 1: Japanese Patent Laying-Open No. 2004-201439
PTL 2: Japanese Patent Laying-Open No. 2005-198406
PTL 3: Japanese Patent Laying-Open No. 2003-348856
PTL 4: Japanese Patent Laying-Open No. 2008-061300

SUMMARY OF INVENTION

Technical Problem

The technique disclosed in Japanese Patent Laying-Open No. 2004-201439 (PTL 1) is premised on the case of normal state in which an ignition key is turned off so that electric power supply from the power storage device is stopped, rather than the case in which a collision of a vehicle has occurred. Therefore, electric power to a control unit controlling the power conversion device is also normally supplied from the power storage device.

When a collision of a vehicle or the like has occurred, it is necessary to discharge residual charge in the smoothing capacitor. However, a control power supply line for supplying electric power for operating the control unit may be disconnected, or a battery for supplying electric power may drop in voltage, depending on the vehicle state caused by the collision. In such a case, in Japanese Patent Laying-Open No. 2004-201439 (PTL 1), normal converter control by the control unit cannot be performed, so that it may be impossible to consume residual charge.

Therefore, in the event of occurrence of a collision of a vehicle or the like, it is important to discharge residual charge as quickly as possible until the control power supply line and the battery are damaged upon detection of the collision. Moreover, even when the battery drops in voltage, it is necessary to continue a discharge operation of residual charge as long as possible.

The present invention was made to solve these problems, and an object of the present invention is, in a power conversion device of a vehicle, to rapidly discharge residual charge stored in a smoothing capacitor in the power conversion device in the event of a collision of the vehicle.

Solution to Problem

A power conversion device according to the present invention is a power conversion device mounted on a vehicle. The vehicle includes a power storage device supplying DC power to the power conversion device, a collision detection unit for detecting a collision of the vehicle, and a relay configured to be capable of switching between supply and interruption of DC power from the power storage device to the power conversion device, and being interrupted when the collision of the vehicle is detected by the collision detection unit. The power conversion device includes a capacitor, a power conversion unit, a gate driving unit, and a control unit. The power conversion unit includes a switching element and is configured to convert electric power supplied from the power storage device through the relay. The gate driving unit drives a gate of the switching element. The control unit controls the gate driving unit to consume residual charge in the capacitor. The control unit controls the gate driving unit to increase a switching loss of the switching element in response to detection of the collision of the vehicle by the collision detection unit.

Preferably, the gate driving unit includes a driving-voltage changing unit configured to be capable of changing a gate driving voltage for the switching element. The driving-voltage changing unit decreases the gate driving voltage in response to detection of the collision of the vehicle by the collision detection unit.

More preferably, the gate driving unit includes a resistor changing unit configured to be capable of changing a resistance value of a gate resistor of the switching element. The resistor changing unit increases the resistance value of the gate resistor in response to detection of the collision of the vehicle by the collision detection unit.

Still preferably, the resistor changing unit has a first gate resistor and a second gate resistor larger in resistance value than the first gate resistor. The resistor changing unit switches selection of gate resistor from the first gate resistor to the second gate resistor in response to detection of the collision of the vehicle by the collision detection unit.

Yet preferably, the second gate resistor is a resistor for protection of the switching element for gradually stopping the switching element in the event of an abnormality of the switching element.

Preferably, the power conversion unit includes a converter configured to perform voltage conversion of DC power supplied from the power storage device and being capable of both a boosting operation and a step-down operation, and an inverter configured to convert DC power from the converter into AC power. The capacitor includes a first capacitor connected to the converter at a side where the power storage device is connected, and a second capacitor connected to the converter at a side where the inverter is connected. The converter consumes part of residual charge in the first capacitor during the boosting operation, and consumes part of residual charge in the second capacitor during the step-down operation.

More preferably, the control unit controls the converter to repeat the boosting operation and the step-down operation alternately in response to detection of the collision of the vehicle by the collision detection unit.

A vehicle according to the present invention includes a power conversion device, a power storage device, a collision detection unit, and a relay. The power storage device supplies DC power to the power conversion device. The collision detection unit detects a collision of the vehicle. The relay is configured to be capable of switching between supply and interruption of DC power from the power storage device to the power conversion device, and is interrupted when the collision of the vehicle is detected by the collision detection unit. The power conversion device includes a capacitor, a power conversion unit including a switching element and configured to convert electric power supplied from the power storage device through the relay, a gate driving unit for driving a gate of the switching element, and a control unit for controlling the gate driving unit to consume residual charge in the capacitor. The control unit controls the gate driving unit to increase a switching loss of the switching element in response to detection of the collision of the vehicle by the collision detection unit.

Preferably, the gate driving unit includes a driving-voltage changing unit configured to be capable of changing a gate driving voltage for the switching element. The driving-voltage changing unit decreases the gate driving voltage in response to detection of the collision of the vehicle by the collision detection unit.

More preferably, the gate driving unit includes a resistor changing unit configured to be capable of changing a gate resistor of the switching element, and the resistor changing unit increases a resistance value of the gate resistor in response to detection of the collision of the vehicle by the collision detection unit.

Still preferably, the resistor changing unit has a first gate resistor and a second gate resistor larger in resistance value than the first gate resistor. The resistor changing unit switches selection of gate resistor from the first gate resistor to the second gate resistor in response to detection of the collision of the vehicle by the collision detection unit.

More preferably, the second gate resistor is a resistor for protection of the switching element for gradually stopping the switching element in the event of an abnormality of the switching element.

Preferably, the power conversion unit includes a converter configured to perform voltage conversion of DC power supplied from the power storage device and being capable of both a boosting operation and a step-down operation, and an inverter configured to convert DC power from the converter into AC power. The capacitor includes a first capacitor connected to the converter at a side where the power storage device is connected, and a second capacitor connected to the converter at a side where the inverter is connected. The converter consumes part of residual charge in the first capacitor during the boosting operation, and consumes part of residual charge in the second capacitor during the step-down operation.

More preferably, the control unit controls the converter to repeat the boosting operation and the step-down operation alternately in response to detection of the collision of the vehicle by the collision detection unit.

A method of controlling a power conversion device according to the present invention is a method of controlling a power conversion device mounted on a vehicle. The vehicle includes a power storage device supplying DC power to the power conversion device, a collision detection unit for detecting a collision of the vehicle, and a relay configured to be capable of switching between supply and interruption of DC power from the power storage device to the power conversion device, and being interrupted when the collision of the vehicle is detected by the collision detection unit. The power conversion device includes a capacitor, a power conversion unit including a switching element and configured to convert electric power supplied from the power storage device through the relay, and a gate driving unit for driving a gate of the switching element. The method of controlling a power conversion device includes the steps of determining whether or not a collision of the vehicle has occurred, and controlling the gate driving unit to increase a switching loss of the switching element, and to consume residual charge in the capacitor in response to occurrence of the collision of the vehicle.

Advantageous Effects of Invention

According to the present invention, in a power conversion device of a vehicle, residual charge stored in a smoothing capacitor in the power conversion device can be discharged rapidly in the event of a collision of the vehicle.

DESCRIPTION OF EMBODIMENTS

Figure 1:
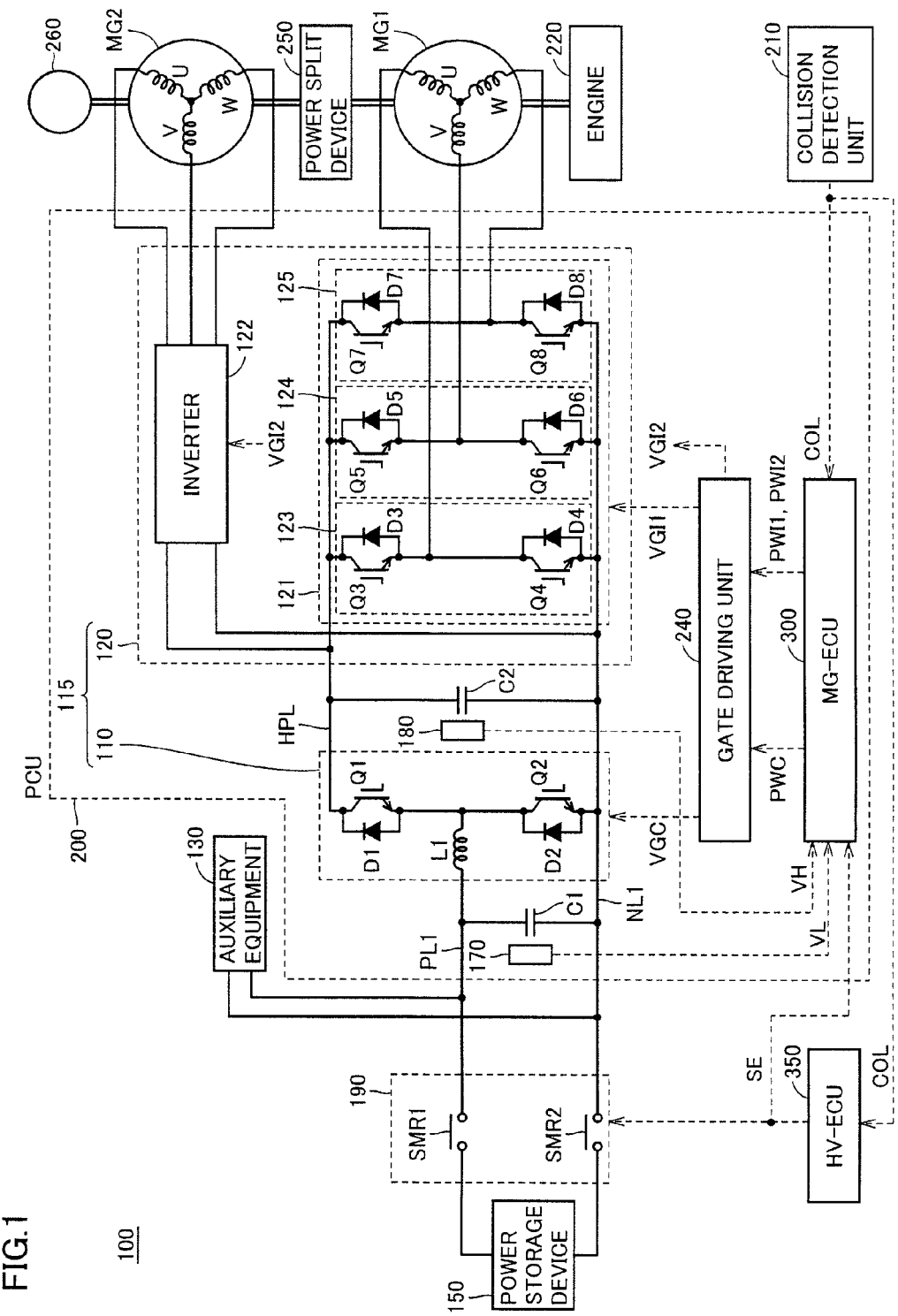
FIG. 1 is an overall block diagram of a vehicle according to a first embodiment.

Embodiments of the present invention will be described below in detail with reference to the drawings. It is noted that identical or corresponding parts in the drawings are denoted by identical reference characters, and description thereof will not be repeated.

First Embodiment

FIG. 1 is an overall block diagram of a vehicle 100 according to a first embodiment. In the first embodiment, a hybrid vehicle with an engine and a motor generator mounted thereon will be described as vehicle 100 by way of example, however, the structure of vehicle 100 is not limited as such, and any vehicle that can run with electric power from a power storage device is applicable. Vehicle 100 includes, for example, an electric vehicle, a fuel cell vehicle and the like, as well as a hybrid vehicle. It is also applicable to a vehicle including a power conversion device even though incapable of running with electric power from a power storage device.

With reference to FIG. 1, vehicle 100 includes a power storage device 150, a power conversion device (hereinafter also referred to as PCU "Power Control Unit") 200, motor generators MG1, MG2, a power split device 250, an engine 220, a driving wheel 260, a collision detection unit 210, a system main relay 190, auxiliary equipment 130, and an HV-ECU (Electronic Control Unit) 350.

Power storage device 150 is an electric power storage element configured to be chargeable and dischargeable. Power storage device 150 includes, for example, a secondary battery such as a lithium ion battery, a nickel-metal hydride battery or a lead acid battery, or a power storage element such as an electric double layer capacitor.

Power storage device 150 is connected to PCU 200 with system main relay 190 interposed therebetween, by means of a power supply line PL1 and a ground line NL1. Power storage device 150 supplies DC power for driving motor generators MG1, MG2 to PCU 200. Power storage device 150 also stores electric power generated by motor generators MG1, MG2 supplied through PCU 200. The voltage of electric power supplied from power storage device 150 is about 200V, for example.

System main relay 190 includes relays SMR1 and SMR2. Relays SMR1, SMR2 are inserted in power supply line PL1 and ground line NL1, respectively. System main relay 190 is controlled by HV-ECU 350, and switches between supply and interruption of electric power from power storage device 150 to PCU 200.

Collision detection unit 210 includes a sensor (e.g., a G sensor) not shown, and detects whether or not vehicle 100 has collided. Collision detection unit 210 then outputs a collision signal COL as a detection result to HV-ECU 350 and MG-ECU 300.

HV-ECU 350 includes a CPU (Central Processing Unit), a memory device and an input/output buffer neither shown, and controls each device of vehicle 100. It is noted that control of them is not limited to processing by software, but also can be constructed and processed by dedicated hardware (an electronic circuit).

HV-ECU 350 receives an input of collision signal COL of vehicle 100 from collision detection unit 210.

HV-ECU 350 generates a relay control command SE, and controls relays SMR1 and SMR2 of system main relay 190. Specifically, when relay control command SE is set at ON, contacts of relays SMR1, SMR2 are closed, so that electric power is supplied from power storage device 150 to PCU 200. On the other hand, when relay control command SE is set at OFF, the contacts of relays SMR1, SMR2 are opened, so that electric power from power storage device 150 to PCU 200 is interrupted.

When detected a collision of vehicle 100 by collision signal COL, HV-ECU 350 controls relays SMR1, SMR2 such that electric power from power storage device 150 to PCU 200 is interrupted.

HV-ECU 350 also outputs relay control command SE to MG-ECU 300 to inform the control state of relays SMR1, SMR2.

Auxiliary equipment 130 is connected to power supply line PL1 and ground line NL1 in parallel to PCU 200. Auxiliary equipment 130 includes a DC-DC converter for driving a device having a voltage (e.g., 14V) lower than the voltage of electric power supplied from power storage device 150, an air conditioner for air-conditioning the inside of the vehicle, and the like, neither shown.

PCU 200 converts DC power from power storage device 150 into AC power for supply to motor generators MG1, MG2. PCU 200 also converts AC power generated by motor generators MG1, MG2 into DC power to charge power storage device 150.

Motor generators MG1, MG2 generate rotary driving force for vehicle propulsion upon receipt of AC power supplied from PCU 200. Motor generators MG1, MG2 are externally supplied with rotary force to generate AC power according to a regeneration torque command from MG-ECU 300 and generate regenerative braking power for vehicle 100.

Motor generators MG1, MG2 are also connected to engine 220 with power split device 250 interposed therebetween. Control is exerted such that driving force generated by engine 220 and driving force generated by motor generators MG1, MG2 show an optimum ratio. One of motor generators MG1, MG2 may function mainly as a motor, and the other motor generator may function mainly as a generator. It is noted that, in the first embodiment, motor generator MG1 shall function as a generator driven by engine 220, and motor generator MG2 shall function as a motor that drives driving wheel 260.

To distribute mechanical power of engine 220 to both driving wheel 260 and motor generator MG1, power split device 250 is implemented by a planetary gear mechanism (planetary gear).

PCU 200 includes a power conversion unit 115, smoothing capacitors C1 and C2, voltage sensors 170, 180, MG-ECU 300, and a gate driving unit 240. Power conversion unit 115 includes a converter 110 and an inverter 120. Inverter 120 includes an inverter 121 for driving motor generator MG1, and an inverter 122 for driving motor generator MG2.

Converter 110 includes a reactor L1 with one end connected to power supply line PL1, semiconductor switching elements Q1, Q2 connected in series between a power supply line HPL and ground line NL1, and diodes D1, D2 connected in parallel to semiconductor switching elements Q1, Q2, respectively. The semiconductor switching elements are typically implemented by an IGBT (Insulated Gate Bipolar Transistor), a bipolar transistor, a MOSFET (Metal Oxide Semiconductor), a GTO (Gate Turn Off Thyristor), or the like. It is noted that the present embodiment will describe the case of implementing the semiconductor switching elements by IGBT by way of example.

Reactor L1 has its other end connected to the emitter of semiconductor switching element Q1 and the collector of semiconductor switching element Q2. Diode D1 has its cathode connected to the collector of semiconductor switching element Q1, and diode D1 has its anode connected to the emitter of semiconductor switching element Q1. Diode D2 has its cathode connected to the collector of semiconductor switching element Q2, and diode D2 has its anode connected to the emitter of semiconductor switching element Q2.

Semiconductor switching elements Q1, Q2 are controlled by a gate signal VGC from gate driving unit 240 to be turned on or off.

Inverter 121 receives a boosted voltage from converter 110 to drive motor generator MG1 for starting engine 220, for example. Inverter 121 outputs, to converter 110, regenerative electric power generated by motor generator MG1 with mechanical power transmitted from engine 220. At this time, converter 110 is controlled by MG-ECU 300 so as to operate as a step-down circuit.

Inverter 121 includes a U-phase arm 123, a V-phase arm 124 and a W-phase arm 125. U-phase arm 123, V-phase arm 124 and W-phase arm 125 are connected in parallel between power supply line HPL and ground line NL1.

U-phase arm 123 includes semiconductor switching elements Q3, Q4 connected in series between power supply line HPL and ground line NL1, and diodes D3, D4 connected in parallel to semiconductor switching elements Q3, Q4, respectively. Diode D3 has its cathode connected to the collector of semiconductor switching element Q3, and diode D3 has its anode connected to the emitter of semiconductor switching element Q3. Diode D4 has its cathode connected to the collector of semiconductor switching element Q4, and diode D4 has its anode connected to the emitter of semiconductor switching element Q4.

V-phase arm 124 includes semiconductor switching elements Q5, Q6 connected in series between power supply line HPL and ground line NL1, and diodes D5, D6 connected in parallel to semiconductor switching elements Q5, Q6, respectively. Diode D5 has its cathode connected to the collector of semiconductor switching element Q5, and diode D5 has its anode connected to the emitter of semiconductor switching element Q5. Diode D6 has its cathode connected to the collector of semiconductor switching element Q6, and diode D6 has its anode connected to the emitter of semiconductor switching element Q6.

W-phase arm 125 includes semiconductor switching elements Q7, Q8 connected in series between power supply line HPL and ground line NL1, and diodes D7, D8 connected in parallel to semiconductor switching elements Q7, Q8, respectively. Diode D7 has its cathode connected to the collector of semiconductor switching element Q7, and diode D7 has its anode connected to the emitter of semiconductor switching element Q7. Diode D8 has its cathode connected to the collector of semiconductor switching element Q8, and diode D8 has its anode connected to the emitter of semiconductor switching element Q8.

Motor generator MG1 is implemented by, for example, a three-phase AC motor generator having a rotor with permanent magnets embedded therein and a stator having three-phase coils Y-connected at a neutral point, and three U, V and W-phase coils each have one end connected in common to the neutral point. The U-phase coil has the other end connected to the connection node between semiconductor switching elements Q3, Q4. The V-phase coil has the other end connected to the connection node between semiconductor switching elements Q5, Q6. The W-phase coil has the other end connected to the connection node between semiconductor switching elements Q7, Q8.

Inverter 121 turns on or off the above-described semiconductor switching elements Q3 to Q8 in accordance with a gate signal VGI1 from gate driving unit 240, thereby converting DC power supplied from converter 110 into desired AC power.

Inverter 122 is connected converter 110 in parallel to inverter 121.

Inverter 122 converts a DC voltage output from converter 110 into a three-phase alternating current for output to motor generator MG2 that drives driving wheel 260. Inverter 122 outputs regenerative electric power generated at motor generator MG2 to converter 110 in accordance with regenerative braking. At this time, converter 110 is controlled by MG-ECU 300 so as to operate as a step-down circuit. The inner configuration of inverter 122 is similar to that of inverter 121 although not shown, detailed description of which will not be repeated.

Smoothing capacitor C1 is connected between power supply line PL1 and ground line NL1, and absorbs a ripple voltage while semiconductor switching elements Q1, Q2 are switched on and off. Smoothing capacitor C2 is connected between power supply line HPL and ground line NL1, and absorbs a ripple voltage generated at converter 110 and inverter 120 when they are switched on and off.

Converter 110 consumes residual charge in smoothing capacitor C1 by a boosting operation, and consumes residual charge in smoothing capacitor C2 by a step-down operation.

Voltage sensor 170 detects a voltage VL across smoothing capacitor C1, and outputs detected voltage VL to MG-ECU 300. Voltage sensor 180 detects a voltage VH across smoothing capacitor C2, that is, an output voltage of converter 110 (equivalent to an input voltage to inverter 120), and outputs detected voltage VH to MG-ECU 300.

Gate driving unit 240 outputs gate driving signals VGC, VGI1 and VGI2 for the semiconductor switching elements to converter 110 and inverters 121, 122, respectively, in accordance with a control signal PWC and control signals PWI1, PWI2 from MG-ECU 300.

Gate driving unit 240 changes gate driving signals VGC, VGI1 and VGI2 in gate voltage and gate resistance when vehicle 100 has collided, as will be described later with reference to FIGS. 3 and 7.

MG-ECU 300 includes a CPU, a memory device and an input/output buffer neither shown, and controls gate driving unit 240 in PCU 200. It is noted that control of them is not limited to processing by software, but also can be constructed and processed by dedicated hardware (an electronic circuit).

MG-ECU 300 receives input of voltages VL, VH across smoothing capacitors C1 and smoothing capacitor C2 from voltage sensors 170, 180, respectively. MG-ECU 300 receives input of collision signal COL of vehicle 100 from collision detection unit 210. Further, MG-ECU 300 receives input of relay control command SE from HV-ECU 350.

MG-ECU 300 controls gate driving unit 240 by control signal PWC to drive semiconductor switching elements Q1, Q2 of converter 110, thereby causing converter 110 to perform a boosting operation or a step-down operation.

MG-ECU 300 controls gate driving unit 240 by control signals PWI1, PWI2 to drive the semiconductor switching elements of inverter 120, thereby converting DC power supplied from converter 110 into AC power by means of inverter 120.

MG-ECU 300 detects a collision of vehicle 100 by collision signal COL from collision detection unit 210, and when detected that power storage device 150 and PCU 200 are electrically separated by relay control command SE, controls at least one of converter 110 and inverter 120, thereby causing residual charge stored in smoothing capacitors C1, C2 to be consumed.

Herein, when power conversion unit 115 such as converter 110 or inverter 120 is driven, switching losses by switching of semiconductor switching elements Q1 to Q8 and conduction losses caused by a current flowing through reactor L1 occur. Therefore, in the event of a collision of vehicle 100, residual charge in smoothing capacitors C1, C2 can be consumed by driving converter 110 to repeat a boosting operation and a step-down operation or driving motor generators MG1, MG2 by means of inverter 120.

It is noted that driving of inverter 120 is premised that inverter 120 and motor generator MG1 or MG2 are not disconnected. When inverter 120 is driven, control is exerted to supply only the field current component (d-axis current) of motor generators MG1, MG2, for example, so that electric power by residual charge can be consumed without rotating motor generators MG1, MG2.

When driving force for vehicle propulsion is generated with electric power from the power storage device as in an electric powered vehicle, the output of a motor generator needs to be of relatively high power. Accordingly, a high-voltage and large-capacity capacitor may be mounted for a power conversion device including an inverter, a converter and the like for controlling the motor generators.

Therefore, particularly when a collision of a vehicle or the like occurs, the residual charge need to be discharged as quickly as possible.

Therefore, in the first embodiment, when vehicle 100 has collided, residual-charge discharge control is exerted in which power conversion unit 115 is driven upon changing the gate voltage of gate signals VGC, VGI1, VGI2 that drive semiconductor switching elements Q1 to Q8 included in power conversion unit 115 by means of gate driving unit 240.

Figure 2:
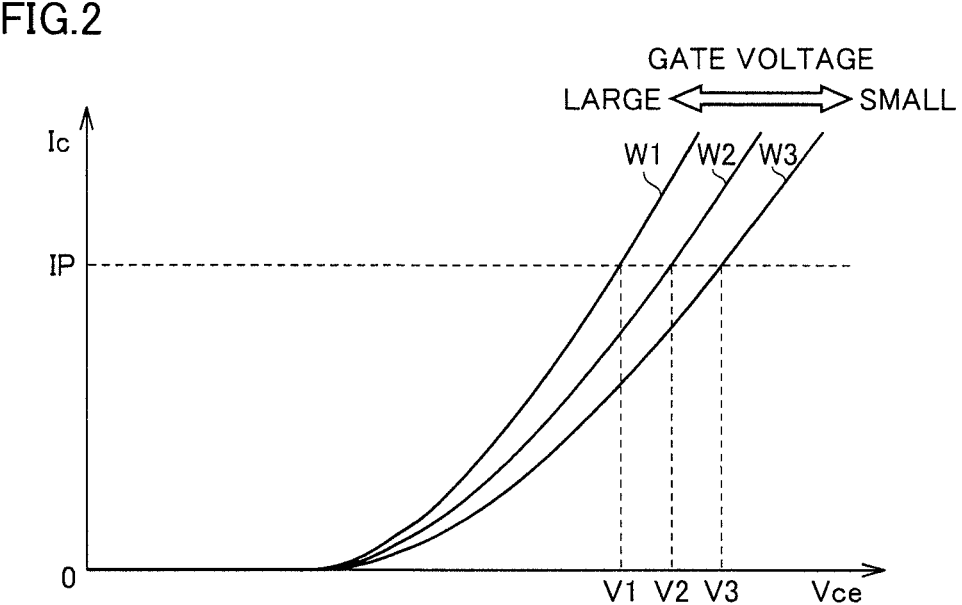
FIG. 2 is a diagram for explaining the relation between voltage and current of semiconductor switching elements when the gate voltage for the semiconductor switching elements is changed.

FIG. 2 is a diagram for explaining the relation between voltage and current of the semiconductor switching elements when the gate voltage for the semiconductor switching elements is changed.

With reference to FIG. 2, the vertical axis and the horizontal axis indicate a collector current Ic flowing through the semiconductor switching elements and a collector-emitter voltage Vce of the semiconductor switching elements, respectively. Lines W1 to W3 represent the relation between collector current Ic and collector-emitter voltage Vce with different gate voltages, respectively. Line W1 represents the case in which the gate voltage is set large, and the gate voltage is set smaller in the order of lines W2 and W3. Herein, representing the gate voltages on lines W1 to W3 as VG1, VG2 and VG3, respectively, the relation VG1>VG2>VG3 holds.

When the semiconductor switching elements are turned on by the gate driving signals, collector current Ic increases with increase in collector-emitter voltage Vce. At this time, electric power obtained by multiplying these collector-emitter voltage Vce and collector current Ic is consumed by the semiconductor switching elements as switching losses.

Herein, in the case where a certain current IP flows through the semiconductor switching elements, when the gate voltage is changed, the voltage generated at the semiconductor switching elements increases (V1<V2<V3) as the gate voltage is set smaller, as indicated by lines W1 to W3. That is, the switching losses caused by the semiconductor switching elements increase as the gate voltage is set smaller. It is noted that current IP is rate-controlled by reactor L1, for example, so that the value is determined.

Generally, in normal running of the vehicle, the gate voltage is set large in order to decrease the losses caused by the semiconductor switching elements to improve fuel efficiency. Therefore, in the event of a collision of the vehicle, the switching losses can be increased by driving the inverter or the converter with the gate voltage set to decrease. Residual charge in the smoothing capacitors can thereby be discharged rapidly.

On the other hand, by decreasing the gate voltage, electric power required to drive the semiconductor switching elements is reduced. Power consumption by gate driving unit 240 is reduced accordingly, allowing the semiconductor switching elements to be driven for a longer time than when the gate voltage is not decreased, even in a case such as when a collision of vehicle 100 causes damage or the like to, for example, a battery that supplies a driving power source for gate driving unit 240 to cause reduction in output power of the battery. A larger amount of residual charge stored in smoothing capacitors C1, C2 can thereby be consumed.

Figure 3:
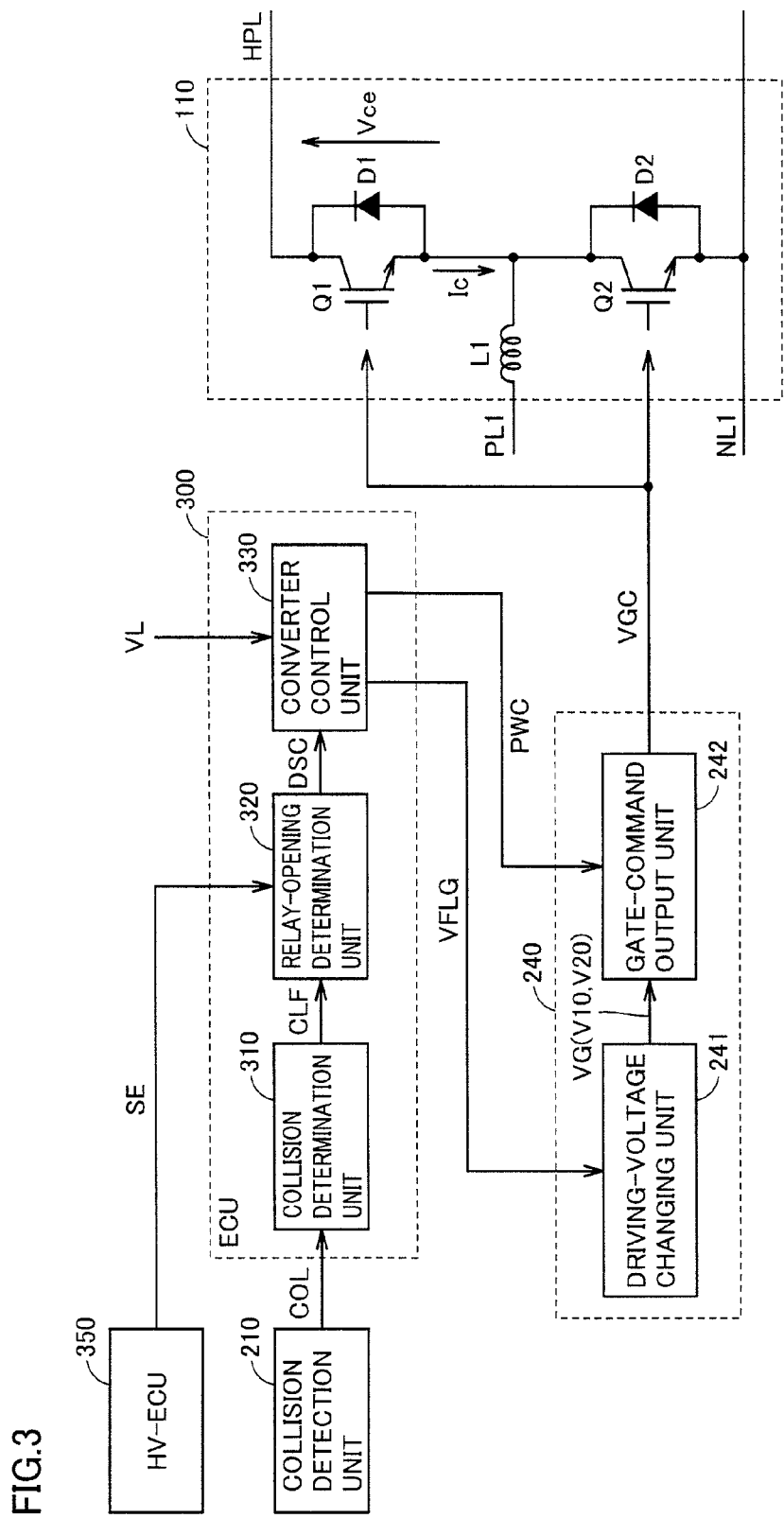
FIG. 3 is a functional block diagram for explaining residual-charge discharge control in the first embodiment.

FIG. 3 is a functional block diagram for explaining residual-charge discharge control in the first embodiment. It is noted that the case of discharging residual charge by causing converter 110 to perform a boosting operation and a step-down operation will be described with reference to FIG. 3 and FIGS. 4 and 5 which will be referred to later, however, residual charge may be discharged by driving inverter 120.

With reference to FIGS. 1 and 3, MG-ECU 300 includes a collision determination unit 310, a relay-opening determination unit 320 and a converter control unit 330. Gate driving unit 240 includes a driving-voltage changing unit 241 and a gate-command output unit 242.

Collision determination unit 310 receives collision signal COL from collision detection unit 210. Collision determination unit 310 determines whether or not a collision of vehicle 100 has occurred based on collision signal COL, and outputs a resultant collision flag CLF to relay-opening determination unit 320. Specifically, collision determination unit 310 sets collision flag CLF at ON when determined that a collision has occurred, and when determined that a collision has not occurred, sets collision flag CLF at OFF.

Relay-opening determination unit 320 receives input of relay control command SE from HV-ECU 350. Relay-opening determination unit 320 also receives input of collision flag CLF from collision determination unit 310.

Then, relay-opening determination unit 320 determines whether or not residual-charge discharge control is to be started based on these signals. Specifically, when collision flag CLF is ON and relay control command SE is OFF, that is, when a collision of vehicle 100 has occurred and power storage device 150 and PCU 200 are electrically separated, a discharge control command DSC is output to converter control unit 330 so as to start residual-charge discharge control.

Converter control unit 330 receives discharge control command DSC from relay-opening determination unit 320 and voltage detection value VL at smoothing capacitor C1 from voltage sensor 170. Upon receipt of input of discharge control command DSC from relay-opening determination unit 320, converter control unit 330 sets a voltage changing flag VFLG at ON for output to driving-voltage changing unit 241 of gate driving unit 240 in order to decrease the setting of a gate voltage VG for semiconductor switching elements Q1, Q2.

Converter control unit 330 generates control signal PWC for output to gate-command output unit 242 of gate driving unit 240 such that a boosting operation and a step-down operation are repeated alternately by converter 110 until voltage detection value VL at smoothing capacitor C1 falls below a predetermined target discharge voltage Vth, thereby causing semiconductor switching elements Q1, Q2 and reactor L1 to consume residual charge in smoothing capacitors C1, C2. It is noted that the discharge state of residual charge may be determined by voltage detection value VH at smoothing capacitor C2, rather than voltage detection value VL at smoothing capacitor C1.

Driving-voltage changing unit 241 receives input of voltage changing flag VFLG from converter control unit 330 of MG-ECU 300. When voltage changing flag VFLG is at OFF, that is, in the case of normal running, driving-voltage changing unit 241 sets the gate voltage at V10. When voltage changing flag VFLG is at ON, that is, in the case where a collision of vehicle 100 has occurred and residual charge needs to be discharged, driving-voltage changing unit 241 sets the gate voltage at a voltage V20 smaller than normal (V10>V20). Driving-voltage changing unit 241 outputs gate-voltage set value VG having been set, to gate-command output unit 242.

Gate-command output unit 242 receives input of gate-voltage set value VG from driving-voltage changing unit 241 and control signal PWC from converter control unit 330 of MG-ECU 300. Then, gate-command output unit 242 sets the gate voltage at gate-voltage set value VG, and outputs gate signal VGC to semiconductor switching elements Q1, Q2 in accordance with control signal PWC. Gate-command output unit 242 thus drives converter 110.

Figure 4:
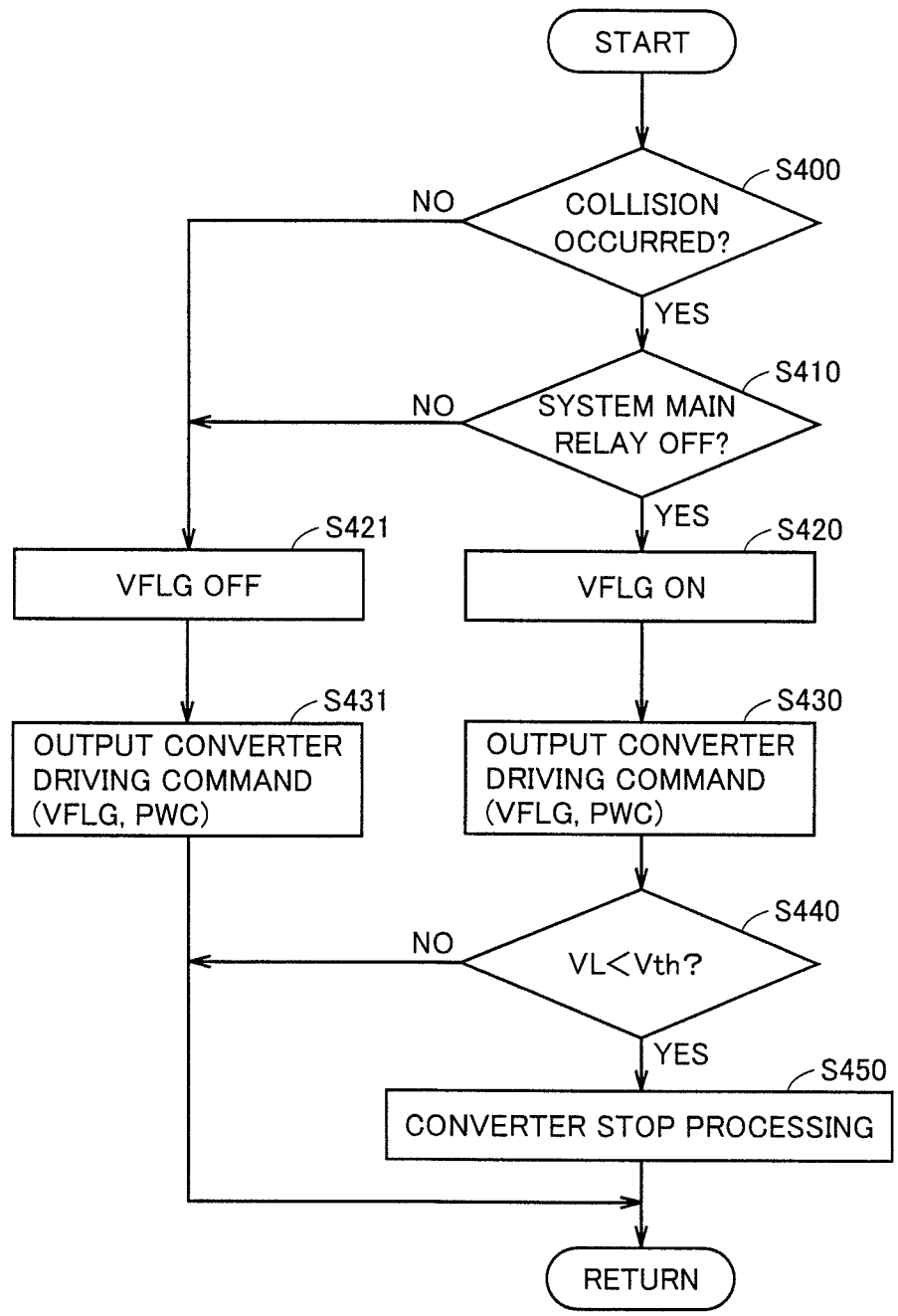
FIG. 4 is a flow chart for explaining residual-charge discharge control processing performed by ECU in the first embodiment.
Figure 5:
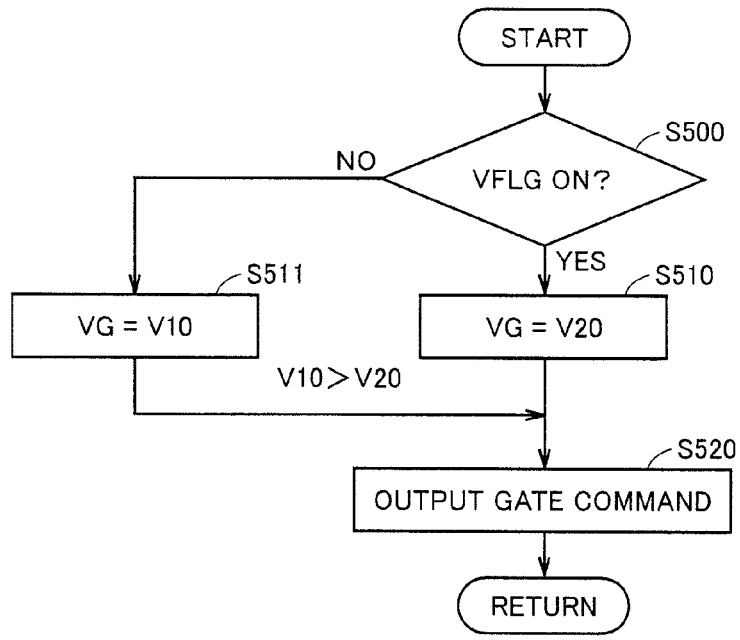
FIG. 5 is a flow chart for explaining residual-charge discharge control processing performed by a gate driving unit in the first embodiment.

FIG. 4 is a flow chart for explaining residual-charge discharge control processing performed by MG-ECU 300 in the first embodiment. FIG. 5 is a flow chart for explaining residual-charge discharge control processing performed by gate driving unit 240 in the first embodiment. Processing of the flow charts shown in FIGS. 4 and 5 is accomplished by invoking a program previously stored in MG-ECU 300 or gate driving unit 240 from a main routine to be executed in a predetermined cycle. Alternatively, processing of some steps may be accomplished by constructing dedicated hardware (an electronic circuit).

With reference to FIGS. 3 and 4, MG-ECU 300 determines, at collision determination unit 310, whether or not vehicle 100 has collided based on collision signal COL from collision detection unit 210 at step (step hereinafter abbreviated to S) 400.

When vehicle 100 has collided (YES at S400), MG-ECU 300 advances the process to S410 to determine, at relay-opening determination unit 320, whether or not power storage device 150 and PCU 200 are electrically separated based on relay control command SE from HV-ECU 350.

When power storage device 150 and PCU 200 are electrically separated, that is, when relay control command SE is OFF (YES at S410), MG-ECU 300 at S420 sets voltage changing flag VFLG at ON to decrease the gate voltage for semiconductor switching elements Q1 and Q2 in order to discharge smoothing capacitors C1, C2 in a short period of time.

Then, at S430, MG-ECU 300 outputs voltage changing flag VFLG set at S420 to gate driving unit 240, and outputs control signal PWC for driving converter 110 to gate driving unit 240 to execute discharge control of residual charge in smoothing capacitors C1, C2 by means of converter 110.

Then, at S440, MG-ECU 300 determines whether or not voltage VL across smoothing capacitor C1 is less than target discharge voltage Vth.

When voltage VL across smoothing capacitor C1 is more than or equal to target discharge voltage Vth (NO at S440), the process is returned to the main routine. Then, discharge control is continued until voltage VL across smoothing capacitor C1 falls below target discharge voltage Vth.

When voltage VL across smoothing capacitor C1 is less than target discharge voltage Vth (YES at S440), MG-ECU 300 at S450 stops control signal PWC for converter 110 to terminate discharge control. Then, the process is returned to the main routine.

Both when a collision of vehicle 100 has not occurred (NO at S400) and when system main relay 190 has not been opened upon occurrence of a collision (NO at S410), the process is advanced to S421, where MG-ECU 300 sets voltage changing flag VFLG at OFF so as to set the gate voltage for semiconductor switching elements Q1, Q2 at the initial value used in normal running. Then, the process is advanced to S431, where MG-ECU 300 outputs voltage changing flag VFLG having been set to gate driving unit 240, and outputs control signal PWC for converter 110 to gate driving unit 240. Then, the process is returned to the main routine.

Then, with reference to FIGS. 3 and 5, at S500, gate driving unit 240 determines, at driving-voltage changing unit 241, whether or not the gate voltage needs to be changed based on voltage changing flag VFLG from MG-ECU 300.

When the gate voltage does not need to be changed (NO at S500), gate driving unit 240 sets gate voltage VG at default value V10 at S511. This default value V10 is a value of the gate voltage used in normal running, and in this case, is set so as to decrease the switching losses of semiconductor switching elements Q1, Q2.

On the other hand, when the gate voltage needs to be changed (YES at S500), gate driving unit 240 sets gate voltage VG at V20 smaller than default value V10 (V10>V20) at S510. Accordingly, as described with reference to FIG. 2, the switching losses of semiconductor switching elements Q1, Q2 increase as compared to normal running.

Thereafter, gate driving unit 240 at S520 outputs gate signal VGC in accordance with control signal PWC from MG-ECU 300, as set at gate voltage VG set at S510 or S511, to semiconductor switching elements Q1, Q2.

As described above, in the first embodiment, in power conversion device 200 of the vehicle, the gate signals that drive semiconductor switching elements Q1 to Q8 included in power conversion device 200 are decreased in voltage in the event of detection of a collision of vehicle 100, thereby discharging residual charge stored in smoothing capacitors C1, C2. With such a configuration, the switching losses when semiconductor switching elements Q1 to Q8 are turned on or off increase during discharge in power conversion device 200, so that discharge of residual charge can be completed in a shorter period of time. Further, the driving power for semiconductor switching elements Q1 to Q8 can be reduced by decreasing the gate signals in voltage VG, so that a discharge operation by power conversion device 200 can be continued for a longer period of time.

Second Embodiment

The first embodiment addresses the technique of setting voltage VG of the gate signals that drive semiconductor switching elements Q1 to Q8 to decrease in the event of a collision of vehicle 100, thereby increasing the switching losses of semiconductor switching elements Q1 to Q8.

The second embodiment will address the technique of changing a gate resistor of an output circuit of gate signal VGC to increase in resistance value in the event of detection of a collision of vehicle 100, thereby increasing switching losses.

Figure 6:
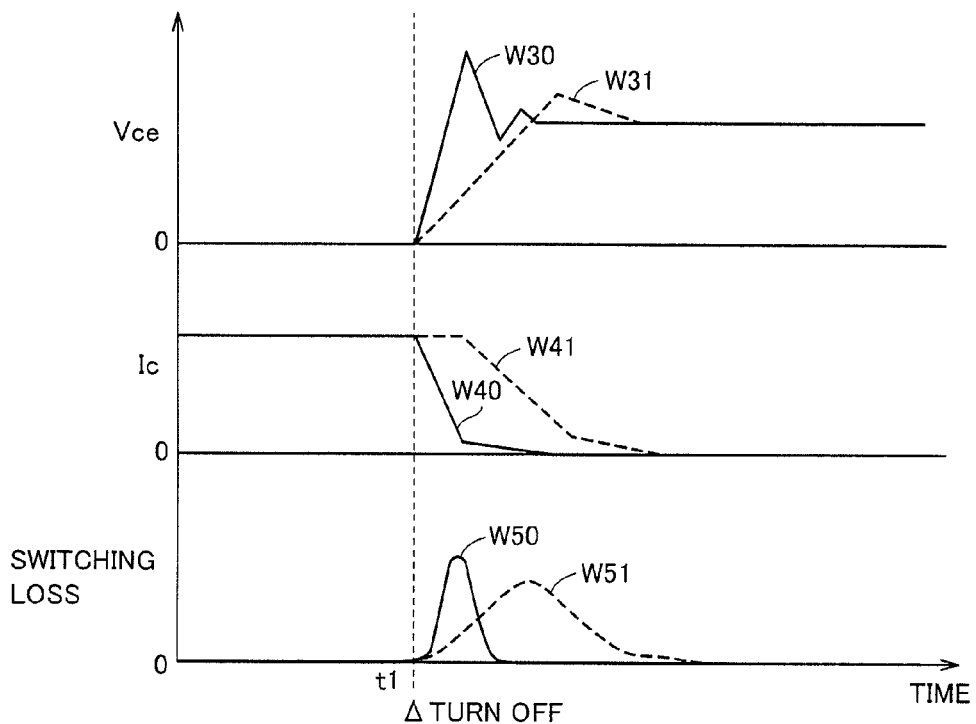
FIG. 6 is a timing chart for explaining changes in voltage and current at the semiconductor switching elements as well as switching losses when gate resistors are changed in resistance.

FIG. 6 is a timing chart for explaining changes in voltage and current at the semiconductor switching elements as well as switching losses when gate resistors are changed in resistance value. In FIG. 6, the horizontal axis indicates time, and the vertical axis indicates collector-emitter voltage Vce at the semiconductor switching elements, collector current Ic flowing through the semiconductor switching elements, and switching losses of the semiconductor switching elements at each time. It is noted that, in the timing chart of FIG. 6, lines W30, W40 and W50 indicated by solid lines represent the cases where the gate resistance is small, and lines W31, W41 and W51 indicated by dashed lines represent the cases where the gate resistance is large. The following description will be directed to semiconductor switching element Q1 of converter 110 as an example.

With reference to FIG. 6, semiconductor switching element Q1 is in the ON state by time t1, and collector-emitter voltage Vce is 0V.

When semiconductor switching element Q1 is turned off at time t1, collector current Ic flowing through semiconductor switching element Q1 decreases while collector-emitter voltage Vce increases. At this time, when the gate resistor has a small resistance value, the gate potential decreases rapidly to turn off semiconductor switching element Q1 in a short period of time, so that collector current Ic decreases in a short period of time (W40 in FIG. 6). Collector-emitter voltage Vce increases accordingly, and the abrupt current change causes a surge voltage due to the wiring inductance, proportional to the current change as indicated by W30 in FIG. 6, to appear in collector-emitter voltage Vce in a transition stage.

Particularly in a case such as where residual charge in smoothing capacitors C1, C2 is discharged as in the present embodiment, control is exerted such that a large current flows through the semiconductor switching elements so as to have residual charge consumed in a short period of time. Therefore, in such a case, a surge voltage further increases, so that the semiconductor switching elements may be damaged due to the surge voltage.

On the other hand, when the gate resistor has a large resistance value, the gate potential decreases slowly, semiconductor switching element Q1 is turned off slowly. Accordingly, collector current Ic decreases gradually as indicated by W41. Therefore, the surge voltage appearing in collector-emitter voltage Vce also decreases in magnitude, which can reduce or avoid damage to the semiconductor switching elements that would be caused by the surge voltage as described above.

When the gate resistance is small, the switching losses at this time disappear in a short period of time, since collector current Ic is reduced to zero rapidly, though the peak value is high as indicated by W50 in FIG. 6. On the other hand, when the gate resistance is large, the peak value is smaller, but a period of time during which collector current Ic flows is longer (W41 in FIG. 6), as a result of which the total switching losses will increase (W51 in FIG. 6).

Therefore, performing switching with increased gate resistance can increase the switching losses, while reducing or avoiding damage to the semiconductor switching elements that would be caused by the surge voltage.

Figure 7:
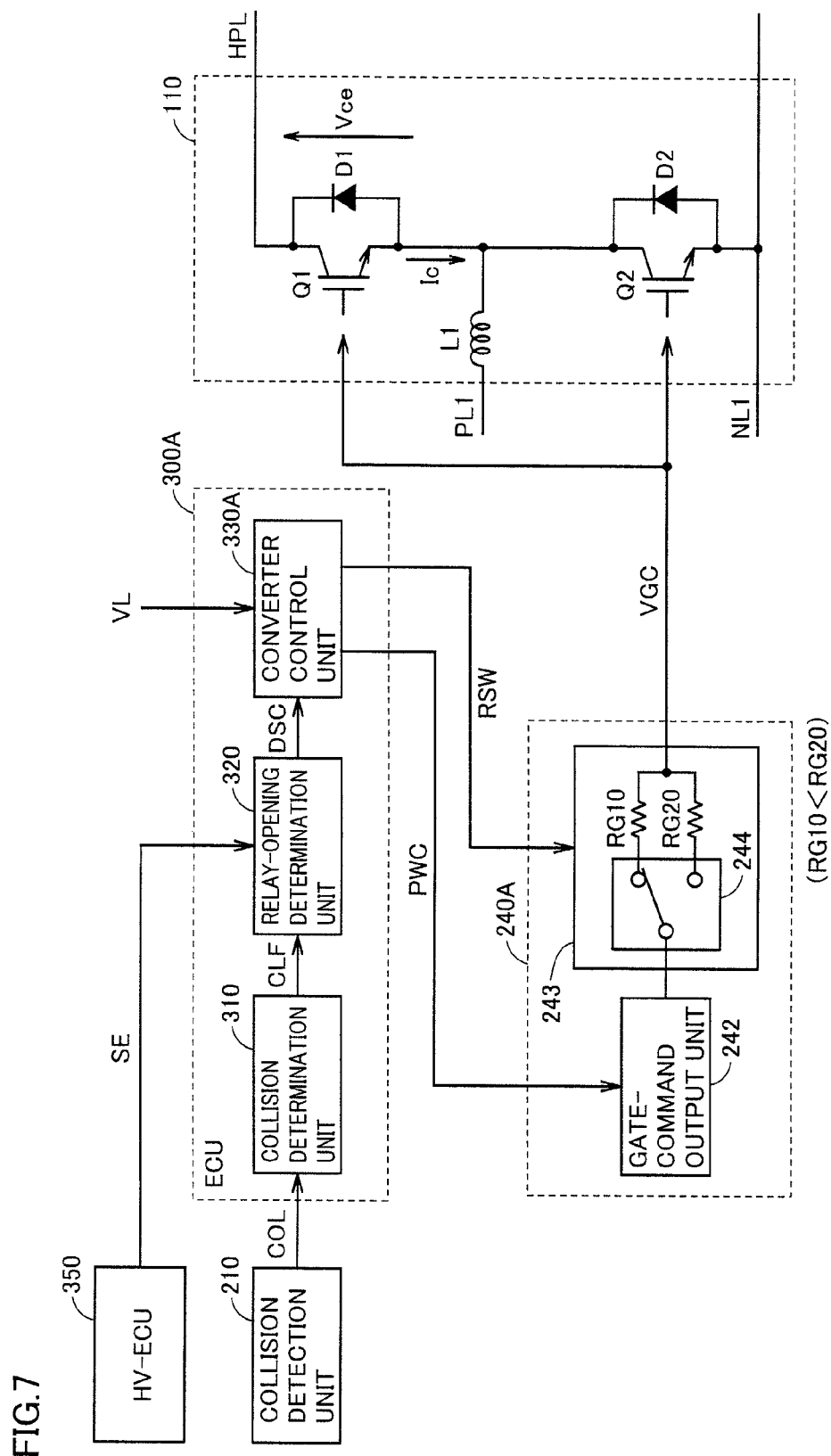
FIG. 7 is a functional block diagram for explaining residual-charge discharge control in a second embodiment.

FIG. 7 is a functional block diagram for explaining residual-charge discharge control in the second embodiment.

In FIG. 7, gate driving unit 240 in FIG. 3 is replaced by a gate driving unit 240A, and MG-ECU 300 is replaced by a MG-ECU 300A. In FIG. 7, description of parts identical to those in FIG. 3 will not be repeated. It is noted that, although the following description will address the case of discharging residual charge by means of converter 110, residual charge may be discharged by means of inverter 120 similarly to the description of the first embodiment.

MG-ECU 300A includes collision determination unit 310, relay-opening determination unit 320 and a converter control unit 330A. Gate driving unit 240A includes gate-command output unit 242 and a resistor changing unit 243. Resistor changing unit 243 includes gate resistors RG10, RG20 (RG10<RG20) and a switch 244.

When a collision of vehicle 100 is detected by collision determination unit 310 and when it is further detected that SMR1 and SMR2 are opened by relay-opening determination unit 320, MG-ECU 300A sets a resistor switching signal RSW at ON at converter control unit 330A for output to resistor changing unit 243 of gate driving unit 240A.

Resistor changing unit 243 switches switch 244 to RG20 of high resistance when resistor switching signal RSW from converter control unit 330A is ON, that is, when the gate resistance is set at a high resistance upon detection of a collision of vehicle 100. On the other hand, when resistor switching signal RSW is OFF, resistor changing unit 243 selects RG10 of low resistance used in a normal state.

Then, gate-command output unit 242 outputs gate signal VGC to semiconductor switching elements Q1, Q2 through resistor changing unit 243 in accordance with control signal PWC from converter control unit 330A, thereby controlling converter 110.

Figure 8:
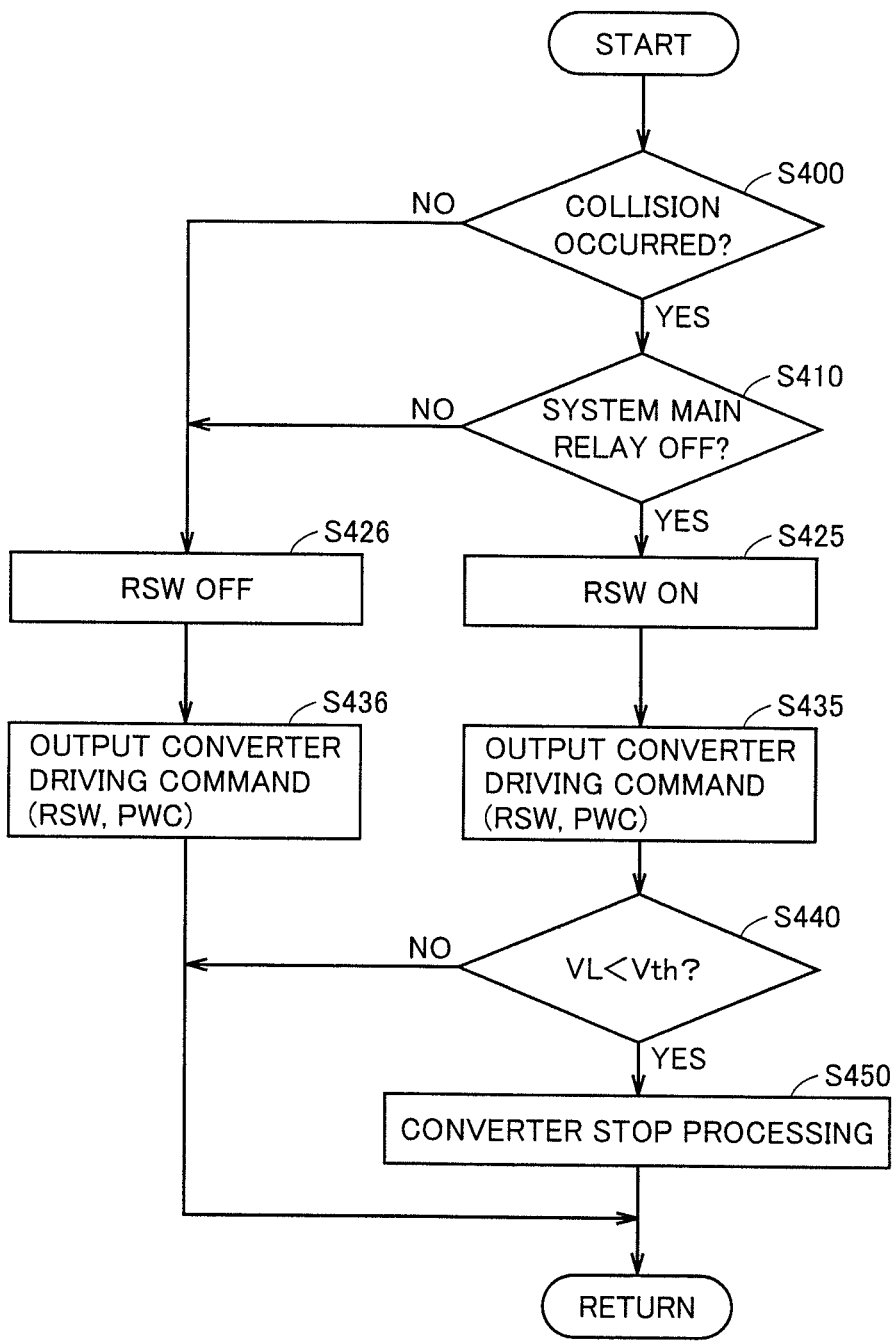
FIG. 8 is a flow chart for explaining residual-charge discharge control processing performed by ECU in the second embodiment.
Figure 9:
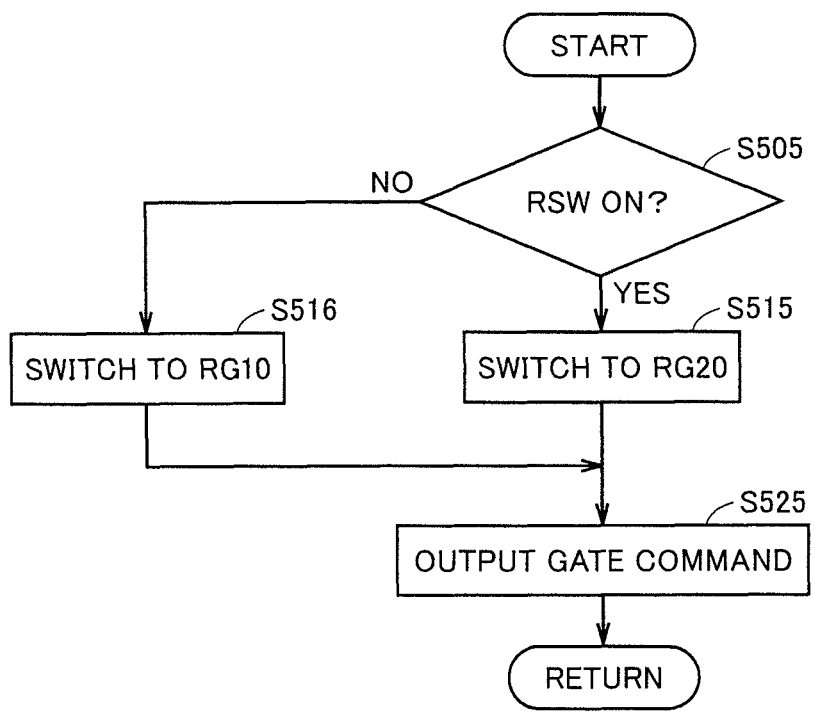
FIG. 9 is a flow chart for explaining residual-charge discharge control processing performed by a gate driving unit in the second embodiment.

FIG. 8 is a flow chart for explaining residual-charge discharge control processing performed by MG-ECU 300A in the second embodiment. FIG. 9 is a flow chart for explaining residual-charge discharge control processing performed by gate driving unit 240A in the second embodiment. Processing of the flow charts shown in FIGS. 8 and 9 is accomplished by invoking a program previously stored in MG-ECU 300A or gate driving unit 240A from a main routine to be executed in a predetermined cycle. Alternatively, processing of some steps may be accomplished by constructing dedicated hardware (an electronic circuit).

In FIG. 8, steps S420, S421, S430, and S431 in the flow chart shown in FIG. 4 are replaced by S425, S426, S435, and S436, respectively. In FIG. 8, description of parts identical to those in FIG. 4 will not be repeated.

With reference to FIGS. 7 and 8, when a collision of vehicle 100 is detected (YES at S400) and when it is further detected that relays SMR1 and SMR2 are opened (YES at S410), MG-ECU 300A advances the process to S435 to set resistor switching signal RSW at ON. Then, MG-ECU 300A at S435 outputs resistor switching signal RSW to resistor changing unit 243 of gate driving unit 240A, and outputs control signal PWC to gate-command output unit 242 to control converter 110. Processing at and subsequent to S440 is similar to that of the description with reference to FIG. 4, description of which will not be repeated.

On the other hand, when a collision of vehicle 100 is not detected (NO at S400) or when it is not detected that relays SMR1 and SMR2 are opened (NO at S410), MG-ECU 300A advances the process to S426 to set resistor switching signal RSW at OFF.

Then, at S436, MG-ECU 300A outputs resistor switching signal RSW to resistor changing unit 243 of gate driving unit 240A, and outputs control signal PWC to gate-command output unit 242 to control converter 110. Then, the process is returned to the main routine.

With reference to FIGS. 7 and 9, gate driving unit 240A at S505 determines whether or not the gate resistance is to be switched to high resistance based on resistor switching signal RSW from converter control unit 330A of MG-ECU 300A.

When resistor switching signal RSW is ON, that is, when the gate resistance is to be switched to high resistance (YES at S505), gate driving unit 240A advances the process to S515, and controls switch 244 to select RG20 of high resistance.

On the other hand, when resistor switching signal RSW is OFF, that is, when the gate resistance does not need to be switched to high resistance (NO at S505), gate driving unit 240A advances the process to S516, and controls switch 244 to select RG10 of low resistance.

Then, gate driving unit 240A at S525 drives semiconductor switching elements Q1, Q2 based on gate signal VGC in accordance with control signal PWC from converter control unit 330A.

With control exerted in accordance with such a process, in power conversion device 200 of the vehicle, in the event of detection of a collision of vehicle 100, the gate resistors that drive semiconductor switching elements Q1 to Q8 included in power conversion device 200 are set to have a large resistance value, and discharge of residual charge stored in smoothing capacitors C1, C2 is performed. Such a configuration can decrease or avoid a surge voltage appearing in semiconductor switching elements Q1 to Q8 during discharge in power conversion device in the event of a collision, and increases the switching losses caused when semiconductor switching elements Q1 to Q8 are turned on or off. Accordingly, discharge of residual charge can be completed in a shorter period of time, while protecting semiconductor switching elements Q1 to Q8.

It is noted that, in the second embodiment as well, the driving power for the semiconductor switching elements may be reduced by further applying the first embodiment to set gate voltage VG to decrease.

Some gate driving units generally include as standard a resistor switching circuit corresponding to resistor changing unit 243 of FIG. 7 for soft interruption for preventing a surge voltage as a protective function in the event of an abnormality such as when temperature rise and overcurrent at the semiconductor switching elements occur, and when a power supply voltage for driving the gate driving unit decreases. Therefore, by implementing the gate driving unit by one that includes such a resistor switching circuit as standard, the configuration of the second embodiment can be embodied without additional components.

Figure 10:
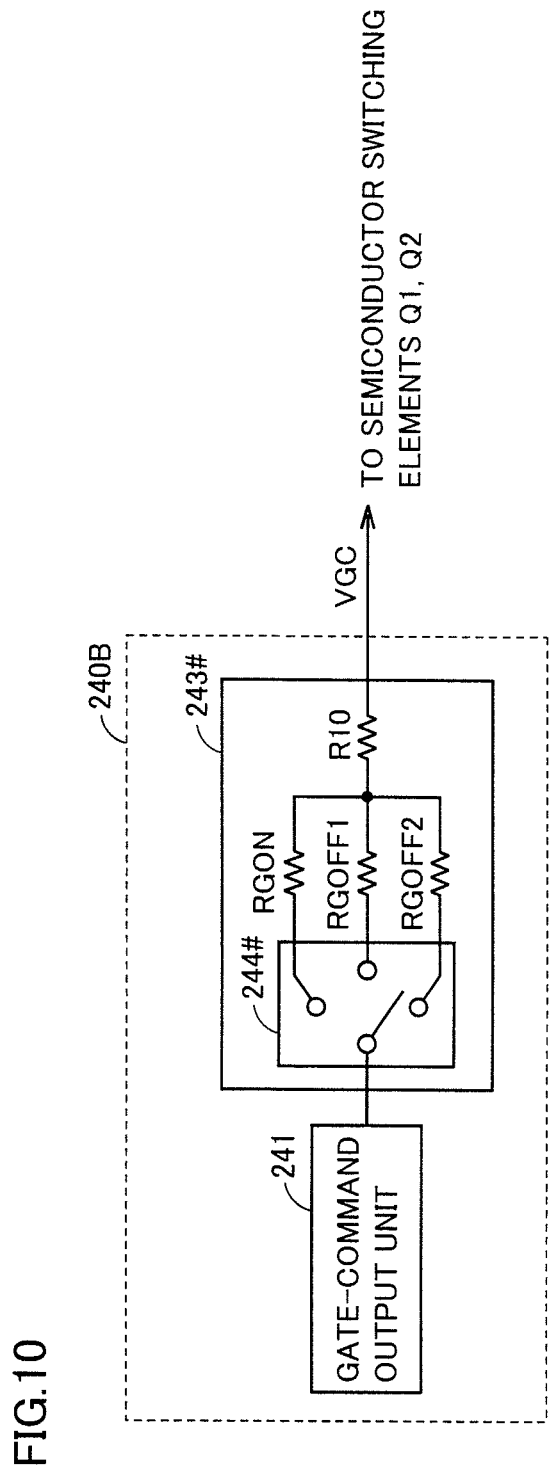
FIG. 10 is a diagram showing an example of a resistor switching circuit provided for a gate driving unit.

FIG. 10 is a diagram showing an example of a resistor switching circuit provided for a gate driving unit.

With reference to FIG. 10, a gate driving unit 240B includes gate-command output unit 241 and a resistor switching circuit 243#. Resistor switching circuit 243# includes a switch 244# and resistors RGON, RGOFF1, RGOFF2, R10.

Resistors RGON, RGOFF1 and RGOFF2 each have one end connected to one another, and the other end connected to switch 244#.

Resistor R10 has one end connected to the connection node of resistors RGON, RGOFF1 and RGOFF2, and the other end connected to the gate of semiconductor switching element Q1 or Q2 (FIG. 7).

Switch 244# is controlled to select resistor RGON when turned on, and to select resistor RGOFF1 of low resistance when turned off normally (when there is no abnormality). Switch 244# is also controlled to select resistor RGOFF2 of high resistance when turned off in the event that an abnormality, such as temperature rise and overcurrent at the semiconductor switching elements and decrease in power supply voltage at gate driving unit 240B, is detected by a sensor not shown or the like, in order to accomplish soft interruption of the semiconductor switching elements.

By performing the process in accordance with FIGS. 8 and 9 using such gate driving unit 240B including as standard resistor switching circuit 243# as a protective function, the configuration of the second embodiment can be embodied without additional components.

It is noted that smoothing capacitors C1 and C2 in the present embodiments represent "a first capacitor" and "a second capacitor" of the present invention, respectively, by way of example. MG-ECUs 300, 300A in the present embodiments represent "a control unit" of the present invention, by way of example.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

REFERENCE SIGNS LIST 100 vehicle; 110 converter; 115 power conversion unit; 120, 121, 122 inverter; 123 U-phase arm; 124 V-phase arm; 125 W-phase arm; 130 auxiliary equipment; 150 power storage device; 170, 180 voltage sensor; 190 system main relay; 200 PCU; 210 collision detection unit; 220 engine; 240, 240A, 240B gate driving unit; 241 driving-voltage changing unit; 242 gate-command output unit; 243 resistor changing unit; 243# resistor switching circuit; 244, 244# switch; 250 power split device; 260 driving wheel; 300, 300 MG-ECU; 310 collision determination unit; 320 relay-opening determination unit; 330, 330A converter control unit; 350 HV-ECU; C1, C2 smoothing capacitor; D1-D8 diode; HPL, PL1 power supply line; L1 reactor; MG1, MG2 motor generator; NL1 ground line, Q1-Q8 semiconductor switching element; RG10, RG20, RGON, RGOFF1, RGOFF2, R10 resistor; SMR1, SMR2 relay

The invention claimed is:

1. A power conversion device mounted on a vehicle, said vehicle including
  a power storage device supplying DC power to said power conversion device,
  a collision detection unit for detecting a collision of said vehicle, and
  a relay configured to be capable of switching between supply and interruption of DC power from said power storage device to said power conversion device, and being interrupted when the collision of said vehicle is detected by said collision detection unit,
said power conversion device comprising:
a capacitor;
a power conversion unit including a switching element and configured to convert electric power supplied from said power storage device through said relay;
a gate driving unit for driving a gate of said switching element; and
a control unit for controlling said gate driving unit to consume residual charge in said capacitor,
said gate driving unit including a resistor changing unit configured to be capable of changing a resistance value of a gate resistor of said switching element,
said resistor changing unit having a first gate resistor, and a second gate resistor larger in resistance value than said first gate resistor and being a resistor for protection of said switching element for gradually stopping said switching element in the event of an abnormality of said switching element, and said control unit controlling said gate driving unit to switch selection of gate resistor from said first gate resistor to said second gate resistor to increase a switching loss of said switching element in response to detection of the collision of said vehicle by said collision detection unit.

2. The power conversion device according to claim 1, wherein said power conversion unit includes a converter configured to perform voltage conversion of DC power supplied from said power storage device and being capable of both a boosting operation and a step-down operation, and an inverter configured to convert DC power from said converter into AC power, said capacitor includes a first capacitor connected to said converter at a side where said power storage device is connected, and a second capacitor connected to said converter at a side where said inverter is connected, and said converter consumes part of residual charge in said first capacitor during said boosting operation, and consumes part of residual charge in said second capacitor during said step-down operation.

3. The power conversion device according to claim 2, wherein said control unit controls said converter to repeat said boosting operation and said step-down operation alternately in response to detection of the collision of said vehicle by said collision detection unit.

4. A vehicle comprising:

a power conversion device;

a power storage device supplying DC power to said power conversion device;

a collision detection unit for detecting a collision of said vehicle; and a relay configured to be capable of switching between supply and interruption of DC power from said power storage device to said power conversion device, and being interrupted when the collision of said vehicle is detected by said collision detection unit, said power conversion device including a capacitor, a power conversion unit including a switching element and configured to convert electric power supplied from said power storage device through said relay, a gate driving unit for driving a gate of said switching element, and a control unit for controlling said gate driving unit, to consume residual charge in said capacitor, said gate driving unit including a resistor changing unit configured to be capable of changing a resistance value of a gate resistor of said switching element, said resistor changing unit having a first gate resistor, and a second gate resistor larger in resistance value than said first gate resistor and being a resistor for protection of said switching element for gradually stopping said switching element in the event of an abnormality of said switching element, and said control unit controlling said gate driving unit to switch selection of gate resistor from said first gate resistor to said second gate resistor to increase a switching loss of said switching element in response to detection of the collision of said vehicle by said collision detection unit.

5. The vehicle according to claim 4, wherein said power conversion unit includes a converter configured to perform voltage conversion of DC power supplied from said power storage device and being capable of both a boosting operation and a step-down operation, and an inverter configured to convert DC power from said converter into AC power, said capacitor includes a first capacitor connected to said converter at a side where said power storage device is connected, and a second capacitor connected to said converter at a side where said inverter is connected, and said converter consumes part of residual charge in said first capacitor during said boosting operation, and consumes part of residual charge in said second capacitor during said step-down operation.

6. The vehicle according to claim 5, wherein said control unit controls said converter to repeat said boosting operation and said step-down operation alternately in response to detection of the collision of said vehicle by said collision detection unit.

7. A method of controlling a power conversion device mounted on a vehicle, said vehicle including a power storage device supplying DC power to said power conversion device, a collision detection unit for detecting a collision of said vehicle, and a relay configured to be capable of switching between supply and interruption of DC power from said power storage device to said power conversion device, and being interrupted when the collision of said vehicle is detected by said collision detection unit, said power conversion device including a capacitor, a power conversion unit including a switching element and configured to convert electric power supplied from said power storage device through said relay, and a gate driving unit for driving a gate of said switching element, said gate driving unit including a resistor changing unit configured to be capable of changing a resistance value of a gate resistor of said switching element, said resistor changing unit having a first gate resistor, and a second gate resistor larger in resistance value than said first gate resistor and being a resistor for protection of said switching element for gradually stopping said switching element in the event of an abnormality of said switching element, said method of controlling comprising the steps of:

determining whether or not a collision of said vehicle has occurred; and controlling said gate driving unit to switch selection of gate resistor from said first gate resistor to said second gate resistor to increase a switching loss of said switching element, and to consume residual charge in said capacitor in response to occurrence of the collision of said vehicle.

\* \* \* \* \*